(12) United States Patent
Queru

(10) Patent No.: US 9,686,400 B2
(45) Date of Patent: Jun. 20, 2017

(54) SYSTEM AND METHOD FOR DRIVING-AWARE NOTIFICATION

(71) Applicant: YAHOO! INC., Sunnyvale, CA (US)

(72) Inventor: Jean-Baptiste Queru, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/564,639

(22) Filed: Dec. 9, 2014

(65) Prior Publication Data

US 2016/0165040 A1  Jun. 9, 2016

(51) Int. Cl.
| | | |
|---|---|---|
| *H04M 3/00* | (2006.01) | |
| *H04M 1/725* | (2006.01) | |
| *B60K 35/00* | (2006.01) | |
| *B60W 50/14* | (2012.01) | |
| *H04M 1/60* | (2006.01) | |

(52) U.S. Cl.
CPC ......... *H04M 1/72577* (2013.01); *B60K 35/00* (2013.01); *B60W 50/14* (2013.01); *B60K 2350/1004* (2013.01); *B60K 2350/1028* (2013.01); *H04M 1/6091* (2013.01); *H04M 1/72569* (2013.01); *H04M 2250/10* (2013.01); *H04M 2250/12* (2013.01)

(58) Field of Classification Search
CPC ......... H04M 1/72577; H04M 1/72569; H04M 1/6091; H04M 2250/10; H04M 2250/12; B60K 35/00; B60K 2350/1004; B60K 2350/1028; B60W 50/14
USPC ................. 455/418, 419, 420, 458
See application file for complete search history.

(56) References Cited

U.S. PATENT DOCUMENTS

| | | | | |
|---|---|---|---|---|
| 2010/0332131 A1* | 12/2010 | Horvitz | ............. | G01C 21/3697 701/414 |
| 2011/0294520 A1* | 12/2011 | Zhou | .................... | H04W 48/04 455/456.1 |
| 2013/0090103 A1* | 4/2013 | Kim | .................. | H04M 1/72577 455/418 |
| 2013/0303106 A1* | 11/2013 | Martin | .................... | H04W 4/12 455/404.2 |
| 2013/0303143 A1* | 11/2013 | Schrader | ........... | H04M 1/72577 455/418 |
| 2014/0248864 A1* | 9/2014 | Rangarajan | ........... | H04W 4/001 455/418 |
| 2014/0303842 A1* | 10/2014 | Boelter | ................. | B60K 35/00 701/36 |
| 2015/0066510 A1* | 3/2015 | Bohrer | ................. | G10L 13/043 704/260 |
| 2015/0266377 A1* | 9/2015 | Hampiholi | ............. | B60K 35/00 455/466 |
| 2016/0090039 A1* | 3/2016 | Tan | .................... | G06K 9/00791 348/148 |

OTHER PUBLICATIONS

Android 5.0 "Correctly Set and Manage Notification Priority," from https://developer.android.com/design/patterns/notifications.html# on Aug. 6, 2014.

* cited by examiner

*Primary Examiner* — Khai M Nguyen
(74) *Attorney, Agent, or Firm* — Cooper Legal Group, LLC

(57) ABSTRACT

A system and method for driver-aware notification that collects and analyzes contextual information about the driving environment to free a device owner from having to decide whether or not to answer an incoming message.

20 Claims, 6 Drawing Sheets

SYSTEM AND METHOD FOR DRIVING-AWARE NOTIFICATION

CROSS-REFERENCE TO RELATED APPLICATIONS

None.

FIELD OF THE INVENTION

The invention disclosed broadly relates to the field of mobile communications systems, and more particularly relates to the field of reducing driver distraction associated with mobile communication systems.

BACKGROUND OF THE INVENTION

Today's proliferation of mobile communication devices offers reliable real-time communication with instant response, allowing individuals to be connected and available at all times. SMS (Short Message Service), also known as the ubiquitous "text message" is currently the most widely used data application in the world. This convenience, however, has become an intrusion into what traditionally had been an individual's "down" time, such as while driving. Distracted driving accounts for approximately twenty-five percent of all police-reported traffic accidents and sadly many of those accidents result in death and/or serious injury. Driving while Distracted (DWD) refers to the growing trend of driving a motor vehicle while talking or texting on a mobile phone. With more than six billion mobile cellular subscribers worldwide, the risk is growing exponentially.

Some solutions have been proposed to address this growing problem. For example, United States Patent Publication No. 2005/0170869A1 "Car-Safe Messaging interfaces for interactive pagers and related methods" offers a solution to the problem by allowing a driver to quickly answer a message by selecting from predefined messages. The shortcoming to this invention is that the driver is still required to interact with the phone in order to see who is calling and select the pre-defined response. The driver must deviate his/her attention from the road in order to make the selection.

When a mobile phone is used in a car to relay notifications to users (including the driver), the notifications can be distracting to the driver, especially if they happen at times when the driver needs his/her full attention on driving. Prior efforts have included unconditionally silencing notifications while in a car, but such mechanisms are so heavy-handed that users disable them in order to not miss important notifications.

Therefore, there is a need for a method to address the problem of driver distraction, without frustrating drivers.

SUMMARY OF THE INVENTION

Briefly, according to an embodiment of the invention a method for driver-aware notification includes steps or acts of: communicating with sensors to continuously monitor driving conditions by gathering a set of contextual awareness metrics from said sensors; analyzing the set of contextual awareness metrics to determine current driving conditions; determining, from the analysis, whether the current driving conditions are safe; setting a safety mode according to the current driving conditions; and delaying notifying the driver of an incoming message when the analysis determines that the current driving conditions are not safe.

According to another embodiment of the current invention, an information processing system for improving driver safety includes: a processor device, a plurality of sensors; and a memory with computer-executable instructions stored thereon. The computer-executable instructions include: communicating with sensors to continuously monitor driving conditions by gathering a set of contextual awareness metrics from said sensors; analyzing the set of contextual awareness metrics to determine current driving conditions; determining, from the analysis, whether the current driving conditions are safe; setting a safety mode according to the current driving conditions; and delaying notifying the driver of an incoming message when the analysis determines that the current driving conditions are not safe.

According to another embodiment of the current invention, a computer program product includes a non-transitory computer-readable storage medium with the computer-executable instructions for improving driver safety as related above.

BRIEF DESCRIPTION OF THE SEVERAL VIEWS OF THE DRAWINGS

To describe the foregoing and other exemplary purposes, aspects, and advantages, we use the following detailed description of an exemplary embodiment of the disclosure with reference to the drawings, in which.

Figure 1:
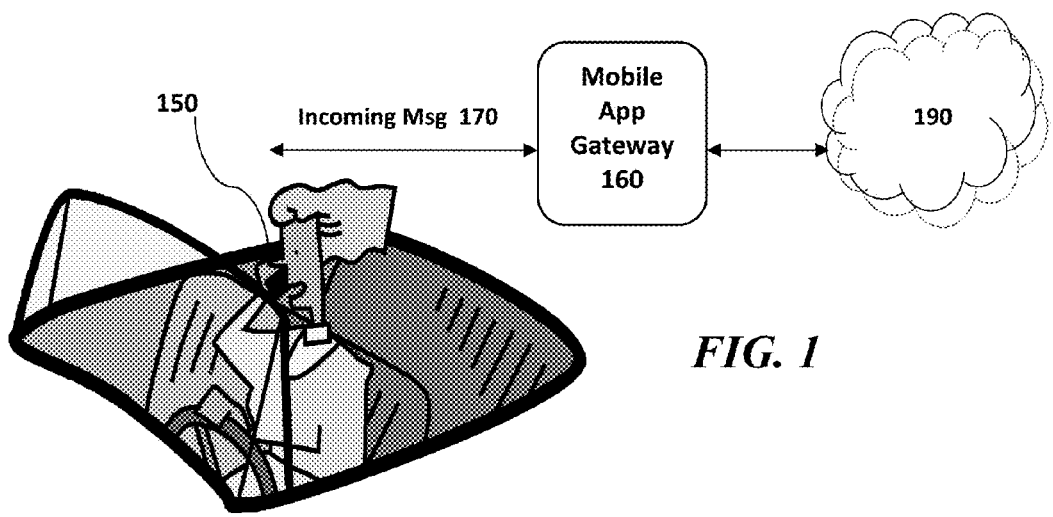
FIG. 1 shows a simplified illustration of a driver-aware notification system configured to operate according to various embodiments of the present disclosure.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Referring now to the drawings in general and to FIG. 1 in particular, there is shown a novel driving-aware notification system 100 that introduces a technological improvement over the known art of notification systems to address the above-stated shortcomings of the known art by. The driving-aware notification system 100 collects and analyzes contextual information about the driving environment to free the device owner from making a decision as to whether or not to answer an incoming message 170 received on a mobile communication device 150 such as a cell phone. To this end, the system 100 enhances available computer technology to delay or throttle message notifications, only releasing the notifications when the driving environment is determined to be in a stable state, i.e., in a state where the release of the notification is less likely to cause an unsafe distraction. The driver-aware notification method can be advantageously used with in-car entertainment, and any communication or navigation systems with which a mobile phone can communicate and share information.

Figure 2:
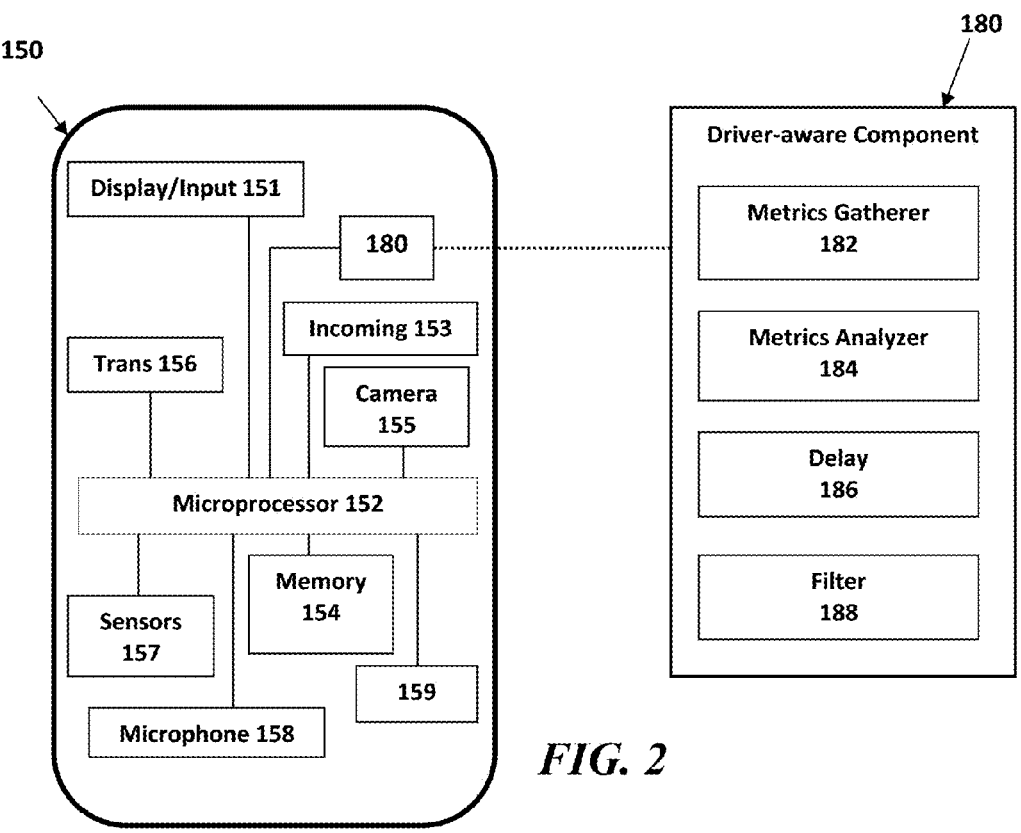
FIG. 2 is a simplified block diagram of the hardware components configured to operate according to embodiments of the present disclosure.

While FIG. 1 shows a basic overview of a conceptualized driver-aware notification system 100, FIG. 2 illustrates the hardware components required to implement the driver-aware notification system 100. The mobile communication device 150 communicates via the Internet 190 through a mobile application gateway 160. The mobile device 150 includes a plurality of components, some of which are illustrated here: a microprocessor 152, an input/output subsystem 151 including a display, a transmitter 156 such as a Bluetooth® transmitter, an incoming call notification subsystem 153, a camera 155, memory 154, a sensor subsystem 157 such as GPS and/or an accelerometer, a microphone 158, and storage 159.

The mobile communication device 150 includes a driver-aware component subsystem 180 to implement the driver-aware notification methods. The components shown here can be actual physical components such as firmware or logical components. They can be pre-loaded or downloaded onto the device 150. Additionally, the driver-aware component can be a special purpose processor. The driver-aware component 180 includes: a Metrics Gatherer 182, a Metrics Analyzer 184, a Delay component 186. and a Filter component 188.

Notifications received on a mobile device 150 or vehicle communication system while driving are a known source of distraction; however, there are circumstances when the distraction risk is acceptable, such as in light traffic, or before embarking on a journey. Under these circumstances, perceived as "safe," the driver-aware component 180 is configured to allow the release of notifications. The driver-aware notification method leverages contextual awareness metrics that are inherently part of the processing available on "smart" mobile phones 150, such as GPS 157 and the capability to sync with a car navigation system.

In one embodiment no fundamental user interface is required to implement the driver-aware notification system 100. In another embodiment, a simple ON/OFF button or toggle switch can be used to activate/deactivate the driving-aware notification processing 180. We anticipate scenarios where drivers will choose to leave the driving-aware notification system 100 in active mode.

Contextual Awareness Metrics.

The Metrics Gatherer 182 gathers Contextual Awareness (CA) metrics and the Metrics Analyzer 184 analyzes the metrics to determine the least inopportune time at which a device 150 should notify the driver of an incoming message. If the Analyzer 184 determines that notifying the driver can cause a dangerous distraction, the Delay component 186 delays transmitting the notification that an incoming message 170 has been received. The Delay component 186 will store the notifications until the Metrics Analyzer 184 deems it safe to do so. The Filter component 188 servers to sort and rank the notifications by perceived importance.

An incoming message 170 can include, inter alia, text messages, instant messages, email messages, social network updates, and calendar reminders, to name a few. The CA metrics are readily available, real-time information about current and expected driving conditions. For purposes of this disclosure, we categorize the CA metrics into five groups: 1) navigation, 2) traffic, 3) weather, 4) road conditions, and 5) driver.

Navigation metrics N include parameters that describe the route taken or to be taken. These can include: navigation waypoints as calculated by a navigation system, destination, and usage patterns. All of this information can be found in the onboard communication systems of modern vehicles. A waypoint as used in this disclosure is defined as a turning or stopping point within a route. Notifications should not be sent immediately before a waypoint or after a waypoint, since the driver will likely be changing lanes or merging into traffic. Similarly, notifications should not be sent before reaching the destination, since there is an expectation that the driver will stop driving at that point.

Navigation might not need to have been explicitly entered by the user: existing usage patterns can be used to infer the likely route and make decisions based on that likely route. Notifications can be displayed soon after departure regardless of other considerations, since they might contain information that would cause the driver to turn around. Notifications can be displayed when the car is stopped in a rest area or is likely to reach an area where stopping safely is possible.

Traffic metrics T include parameters that describe local traffic conditions. For example, notifications should be avoided when there is a slowdown ahead, when roads are flooded, or when road work is being performed. Again, all of this information is available through readily available navigation systems, either in the vehicle, or in the device 150 itself.

Weather metrics W include parameters about the local weather, such as rain, sleet, snow, or other hazardous driving conditions. Notifications should be avoided in bad weather, or at night.

Road condition R metrics include parameters about the road itself, such as steepness, number of turns, and the like. Notifications should be avoided in sections with lots of turns. Even without any information about the expected route, it is possible to determine the driving conditions in the current location of the car, and to infer near-term conditions.

Driver metrics D include parameters about the driver. For example, if the driver has been driving continuously for a long time, we assume the driver is likely tired and it may be best to avoid notifications.

Figure 3:
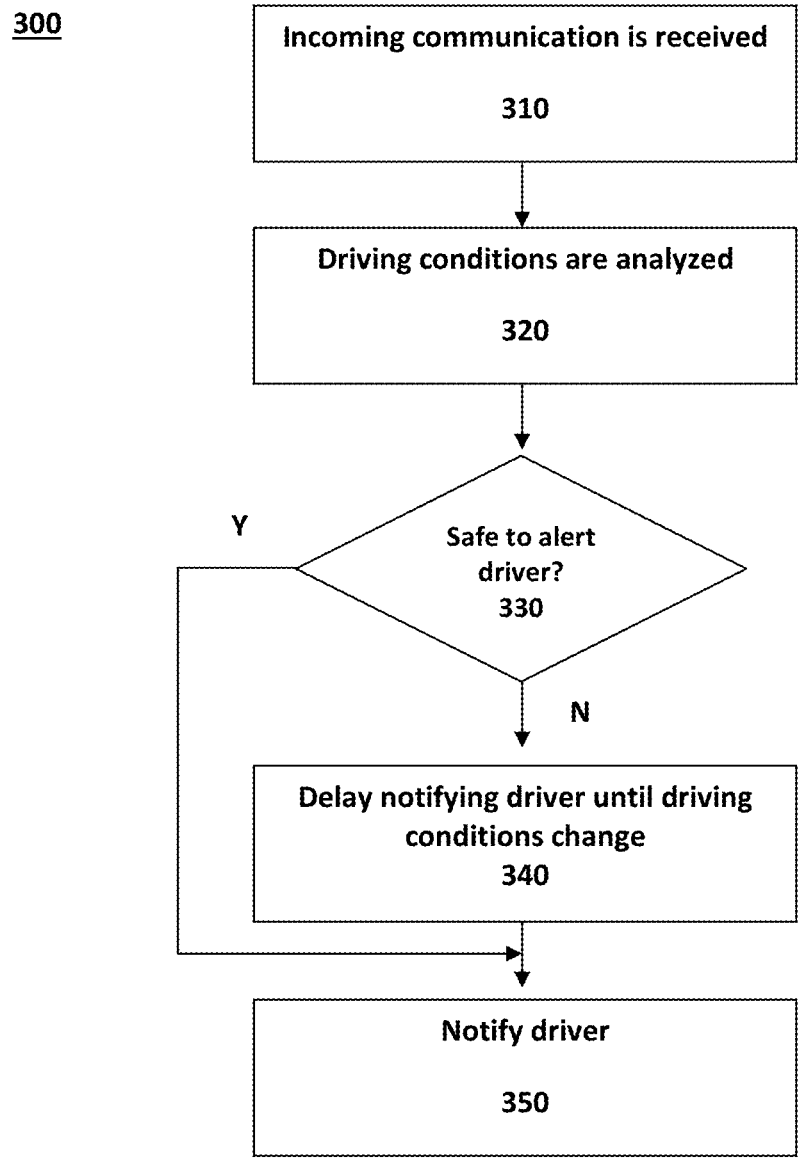
FIG. 3 is a high-level flowchart of the driver-aware method, according to an embodiment of the present disclosure.

Referring now to FIG. 3, there is shown a flowchart 300 of the method steps for driver-aware notifications, according to an embodiment of the present disclosure. In step 310 an incoming communication 170 is received. In step 320 the Metrics Analyzer 184 performs a real-time analysis of the current driving conditions, taking into consideration at least five different parameters: 1) navigation, 2) traffic, 3) weather, 4) road conditions, and 5) driver. Depending on the outcome of the analysis, in decision step 330 the Analyzer 184 determines if it is safe to notify the driver of the incoming communication 170.

If the analysis determines that it is not safe to notify the driver of the incoming message, then in step 340 the Delay component 186 buffers the notification and delays notifying the driver until the driving conditions are safe. Once driving conditions are deemed to be safe, in step 350 the suppressed notifications are delivered by the Delay component 186. There is no need to wait for the vehicle to stop in order for the driving conditions to be deemed "safe."

The messages themselves can be ranked or prioritized to determine if/when a notification should be allowed through. In one implementation, we leverage existing technology that specifies the priorities for messages based on the sources and types of the messages, for example as documented in Samsung's Android website regarding Notifications. The source and types of notifications are independently catalogued to infer the priority of each priority of each notification, e.g. notifications from a messaging app are ranked at a higher priority than notifications from an email app, or notifications for direct email at a higher priority than promotional email.

In another implementation, the driver-aware notification system can classify the priority of the notifications based on the user's patterns, e.g. learning how quickly the user interacts with each type of notification and inferring how time-sensitive each notification is for that user based on past usage patterns. For example, if a specific user is observed to always open email notifications immediately, future email notifications can be assumed to be high priority for that user.

Another way to catalogue incoming messages is by driver vs. passenger. Generally speaking, a notification that is a distraction for the driver of a vehicle is not necessarily a distraction for a passenger in that same vehicle. We provide a way to determine if the notification is for the driver by using available data to distinguish between driver and passenger in multiple ways: a) is the incoming message for a device connected to an in-car Bluetooth® hands-free system; the driver's phone is more likely to be synced with the in-car system; b) similarly, the driver's phone would probably not be interacted with as much while in a car; and c) users who aren't of legal driving age can be assumed to be passengers. The system can vary the way it interprets priorities for driver vs. passenger, such as by inferring the duration of the interaction that could result from a notification, and possibly how relevant a notification might be in a driving context. A severe weather alert for the current location or a location along the set route can be considered to be a high priority for the driver, while an email notification might be ranked as a low priority.

Figure 4:
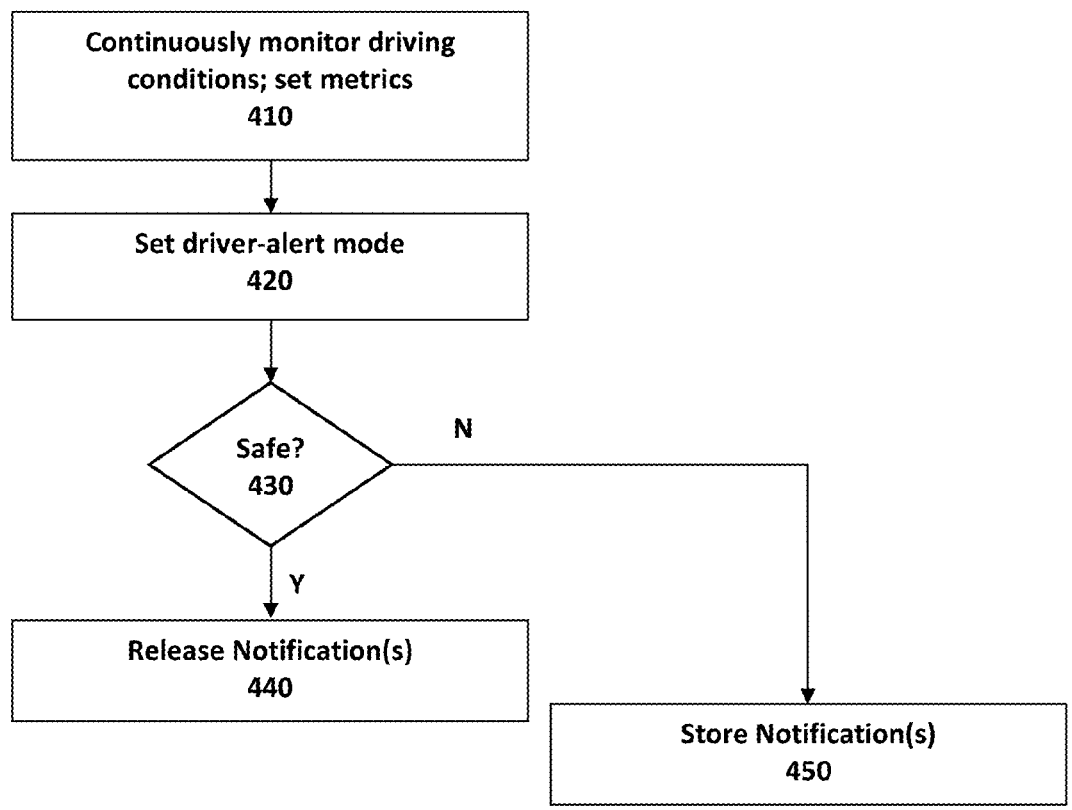
FIG. 4 is a high-level flowchart of the driver-aware method, according to another embodiment of the present disclosure.

Referring now to FIG. 4, there is shown a flowchart 400 of the method steps for driver-aware notifications, according to another embodiment of the present disclosure. In this embodiment, the Driver-Aware Component 180 continuously monitors the driving conditions in step 410, rather than analyzing the driving conditions only when a message is received. In step 420 the Metrics Analyzer 184 sets the driver-alert mode. The driver-alert mode can be a binary setting, SAFE or NOT SAFE. If the driving conditions meet or exceed a pre-set threshold, the driver-alert mode is set to SAFE. Otherwise, it is set to NOT SAFE. The driving conditions threshold can be set to a default setting upon initial use and then later modified by learned behavior.

When the driver-alert system is in SAFE mode, in step 430, incoming message notifications are released in step 440 by the Delay component 186. This includes any message notifications that have been stored by the Delay component 186, pending SAFE mode. The notifications are not released all at once, if there are many. If, however, the system is in NOT SAFE mode, then in step 450 any incoming notifications are suppressed and stored by the Delay component 186.

Figure 5:
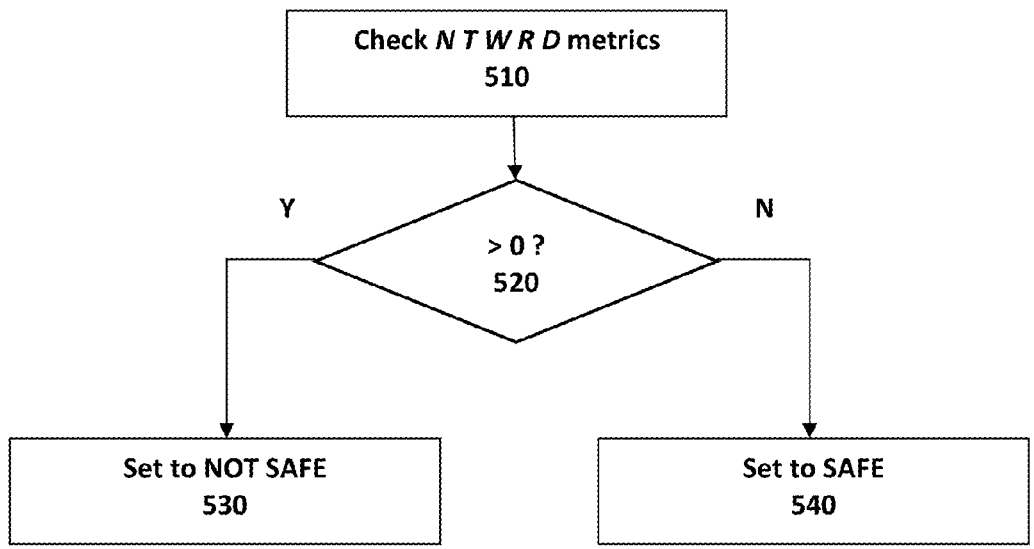
FIG. 5 is a lower-level flowchart of the process for setting the driver-alert mode, according to an embodiment of the present disclosure.

Referring now to FIG. 5, there is shown a lower-level flowchart of the processing steps for setting the driver-alert mode from step 420 in the flowchart of FIG. 4. In step 510 the Metrics Analyzer 184 analyzes the N T W R D metrics gathered by the Metrics Gatherer 182. If any of the metrics are greater than zero (or any pre-selected threshold) in decision step 520, then in step 530 the driver-alert mode is set to NOT SAFE. On the other hand, if none of the metrics are greater than the threshold, then in step 540 the driver-alert mode is set to SAFE. It will be appreciated by one with knowledge in the art that only the simplest example has been provided and that other methods of setting driver-alert mode can be implemented in keeping with the spirit and scope of the disclosure. For example, rather than a binary setting of 0 or 1 for each metric, each metric can be assigned a weighted score, with some metrics having a greater weight. For example, Road conditions R may carry more weight than Traffic T.

Figure 6:
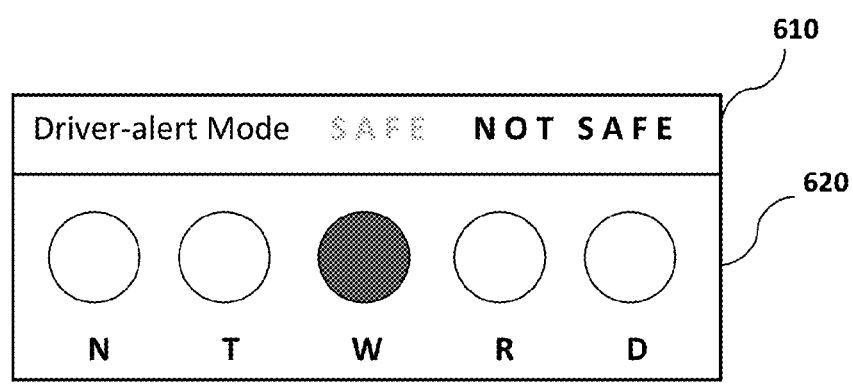
FIG. 6 shows a simplified illustration of a graphical user interface, according to an embodiment of the present disclosure.

FIG. 6 shows a simplified illustration of a graphical user interface (GUI) 600 for driver-alert mode, according to one embodiment of the present disclosure. The GUI 600 can be displayed on the device 150, but it can also be displayed in a vehicle's display console. The GUI 600 shows a banner 610 indicating the driver-alert mode, either SAFE or NOT SAFE. Also shown is a panel 620 of LEDs (light emitting diodes) showing the status of each of the five metrics: N T W R D. In this example, the LED for the Weather metric W shows that it is ON, indicating that weather conditions are unfavorable; therefore the driver-alert mode is set to NOT SAFE.

Figure 7:
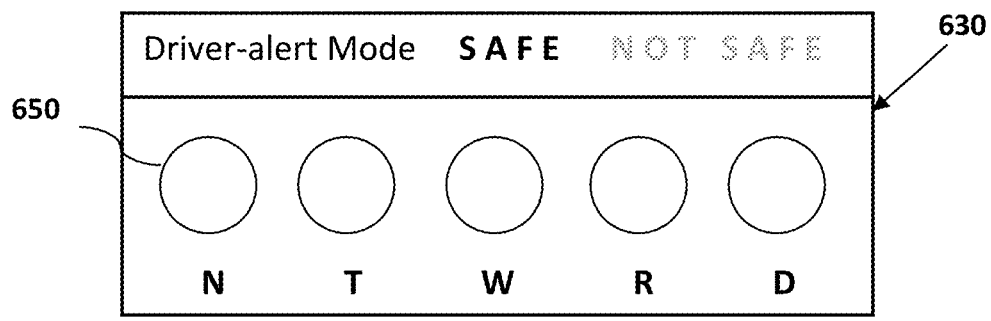
FIG. 7 shows another setting of the graphical user interface of FIG. 5, showing the override feature, according to an embodiment of the present disclosure.

Referring now to the GUI 600 as shown in FIG. 7, we discuss the Override feature of the driver-alert notification system. The Override feature allows the user to override a mode setting using a touch screen 630. For example, the GUI 600 of FIG. 6 shows that the Weather metric W was "ON" indicating less than favorable weather conditions. In this case, the system is set so that driver-alert mode is set to NOT SAFE if any of the metrics are ON, as shown in FIG. 6. Now we consider the scenario where a driver is driving under less than ideal conditions, as determined by the system 100, but not extremely dangerous conditions. Perhaps it is raining, but there is no ice or sleet. All other conditions are favorable. Therefore, as FIG. 7 shows, the driver, or preferably a passenger in the vehicle, using the touch-screen 630, selects the W metric by depressing the LED button 750 labeled W. Selecting the LED buttons toggles them from ON to OFF and vice-versa. By selecting the W button 750, the passenger re-sets the W metric to OFF. With all metrics now in the OFF mode, the driver-alert mode is set to SAFE and message notifications can be released.

Figure 8:
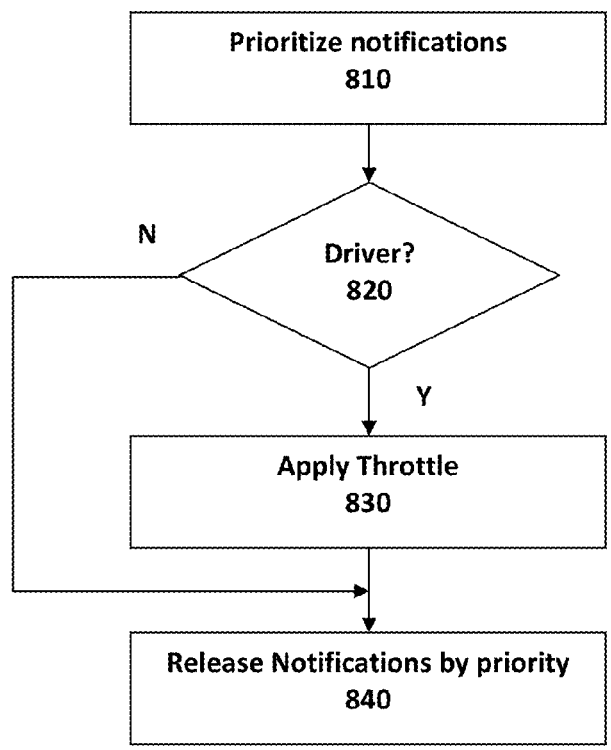
FIG. 8 is a high-level flowchart of the process for prioritizing notifications, according to an embodiment of the present disclosure.

Referring now to FIG. 8, when delivered, notifications might be sorted based on priority, and might also be throttled. Notifications are sorted by category (phone, email, text) and then prioritized in step 810. A determination is made in step 820 as to whether the notifications are for the driver. If so, the notifications for the driver are throttled, or held in step 830. If not, the notifications are released in order of priority in step 840.

In one embodiment, sorting notifications based on priority is accomplished by leveraging known technology that specifies priorities for notifications according to the source of the notification, such as that described at www.developer.android.com/design/patterns/notifications.html (See "Correctly set and manage notification priority"). For example, highest-priority notifications are reserved for turn-by-turn directions, emergency alerts, and incoming calls. The lowest priority notifications are for software updates and junk mail.

In another embodiment, the system 100 can further refine the prioritization process by independently cataloguing both the source and types of notifications in order to infer the priority for each notification. For example, notifications from a messaging app are given a higher priority than notifications from an email app; or notifications for direct email at a higher priority from promotional email.

In another implementation, the driver-aware notification system 100 classifies the priority of the notifications based on the user's patterns, using machine learning. For example the system 100 tracks how quickly the user interacts with each type of notification and then infers how time-sensitive each notification is for that user based on past usage patterns. If a specific user is observed to always open email notifications immediately, future email notifications can be assumed to be a high priority for that user.

In another embodiment, the driver-aware notification system 100 is able to discern between notifications for the driver and notifications in a vehicle, and vary the release of notifications accordingly. For example, notifications for a passenger might be delivered simultaneously to limit the number of distracting audible signals, while notifications for the driver would more likely be spread over time, so that the driver has time to look at the road between notifications. The system can distinguish between driver and passenger in multiple ways: the driver's phone is more likely to be connected to an in-car Bluetooth® hands-free system. Similarly, the driver's phone would probably not be interacted with as much while in a car. Finally, users who aren't of legal driving age can be assumed to be passengers.

As a further refinement, the system 100 can vary the way it interprets priorities for driver versus passenger, such as by inferring the duration of the interaction that can result from a notification, and possibly how relevant a notification might be in a driving context. A severe weather alert for the current location or a location along the set route might be a high priority for the driver, while an email notification might not be a priority for the driver. A voicemail message can be inferred to be too distracting because of its length, therefore the driver will not be notified.

Hardware Embodiment

Figure 9:
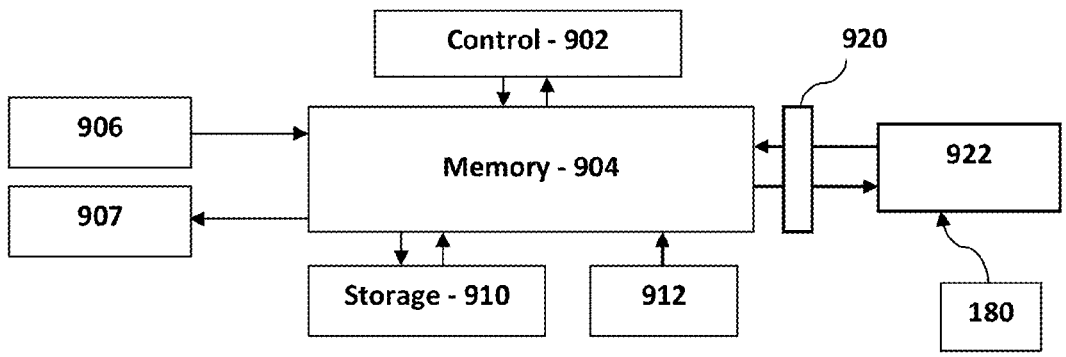
FIG. 9 is a simplified block diagram of a computer information processing system configured to operate according to embodiments of the present invention.

Referring now to FIG. 9, the present disclosure can be embodied as a computer system, a method, and/or a computer program product including a non-transitory computer-readable storage medium 922. The computer program product may include a computer readable storage medium (or media) 922 having computer readable program instructions 180 stored thereon for causing a processor to carry out aspects of the present disclosure. Device 900 includes inter alia, a control module 902 which can include at least one processing device and arithmetic logic units which communicate with an input/output subsystem 906, memory 904, and storage 920.

The control module 902 may include a general or special purpose microprocessor operating under control of computer program instructions executed from memory 904 on program data; or may operate under control of computer program instructions 180 supplied by secondary storage 922. The control module 902 may include a number of special purpose sub-processors for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 904 may be partitioned or otherwise mapped to reflect the boundaries of the various memory subcomponents. Memory 904 may include both volatile and persistent memory for the storage of: operational instructions for execution by the control module 902, data registers, application storage and the like. The computer instructions/applications that are stored in memory 904 are executed by the control module 902.

Sensors 912 detect a property and provide property data that the control module 902 is able to process into information regarding driving and/or driver conditions. Sensors 912 can detect light, movement, noise, orientation, temperature, proximity, touch, moisture, pressure, and a host of other real-world properties that are used by the computer 900 to infer driving conditions. The sensors 912 can be wirelessly coupled with the computer 900.

The Input subsystem 906 may include various end user interfaces such as a keyboard and a touch screen. The Output subsystem 907 can include a display, an audio subsystem and a video subsystem. The computer system 900 may also include a removable storage drive 920, representing a USB drive, a magnetic tape drive, an optical disk drive, and the like. The removable storage drive 920 reads from and/or writes to a removable storage unit 922 in a manner well known to those having ordinary skill in the art. Removable storage unit 922, represents non-transitory media such as a floppy disk, a compact disc, magnetic tape, USB, optical disk, CD-ROM, DVD-ROM, a flash driver, and any removable storage medium now known or known in the future. As will be appreciated, the removable storage unit 922 includes a non-transitory computer readable medium having stored therein computer software and/or data.

In this document, the terms "computer program medium," "computer usable medium," and "computer readable medium" are used to generally refer to both transitory and non-transitory media such as main memory 904, removable storage drive 920, a hard disk, and the like. These computer program products are means for providing software to the computer system 900. The computer readable medium 922 allows the computer system 900 to read data, instructions, messages or message packets, and other computer readable information from the computer readable medium 922.

Therefore, while there has been described what is presently considered to be the preferred embodiment, it will be understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for improving driver safety with mobile communications, comprising:
   receiving contextual awareness metrics corresponding to driving by a user of a device, the contextual awareness metrics comprising at least one of road condition metrics corresponding to a structure of a road or driver metrics corresponding to driving behavior associated with the user;
   analyzing the contextual awareness metrics to determine current driving conditions;
   determining whether the current driving conditions are safe; and
   buffering notifications until the current driving conditions are determined to be safe.

2. The method of claim 1, comprising notifying the user of an incoming message when the current driving conditions are safe.

3. The method of claim 1, the contextual awareness metrics comprising navigation metrics.

4. The method of claim 1, the contextual awareness metrics comprising weather metrics.

5. The method of claim 1, the contextual awareness metrics comprising the road condition metrics corresponding to the structure of the road.

6. The method of claim 1, the contextual awareness metrics comprising the driver metrics corresponding to the driving behavior associated with the user.

7. The method of claim 1, comprising:
   prioritizing incoming messages by source.

8. The method of claim 1, comprising prioritizing incoming messages by type of communication.

9. An information processing system, comprising:
   a processor device; and
   a memory operably coupled with the processor device, the memory having computer-executable instructions stored thereon, the computer-executable instructions, when executed by the processor device, causing a computer to perform:
   receiving contextual awareness metrics corresponding to driving by a user of a device, the contextual awareness metrics comprising at least one of road condition metrics corresponding to a structure of a road or driver metrics corresponding to driving behavior associated with the user;
   analyzing the contextual awareness metrics to determine current driving conditions;
   determining whether the current driving conditions are safe; and
   buffering notifications until the current driving conditions are determined to be safe.

10. The information processing system of claim 9, the contextual awareness metrics comprising at least two of navigation metrics, weather metrics, the road condition metrics corresponding to the structure of the road or the driver metrics corresponding to the driving behavior associated with the user.

11. The information processing system of claim 9, wherein the computer-executable instructions cause the computer to perform notifying the user of an incoming message when the current driving conditions are safe.

12. The information processing system of claim 9, comprising a graphical user interface presented on a touch screen.

13. The information processing system of claim 12, the graphical user interface comprising multiple radio buttons, each radio button associated with one or more of the contextual awareness metrics.

14. The information processing system of claim 9, wherein the computer-executable instructions cause the computer to perform:
   prioritizing incoming messages by source.

15. The information processing system of claim 9, wherein the computer-executable instructions cause the computer to perform prioritizing incoming messages by type of communication.

16. A computer program product comprising a non-transitory computer readable storage medium with computer-executable instructions stored thereon, the computer-executable instructions causing a computer to perform:
   receiving contextual awareness metrics corresponding to driving by a user of a device, the contextual awareness metrics comprising at least one of road condition metrics or driver metrics;
   analyzing the contextual awareness metrics to determine current driving conditions;
   determining whether the current driving conditions are safe; and
   buffering notifications until the current driving conditions are determined to be safe.

17. The computer program product of claim 16, wherein the computer-executable instructions comprise instructions to notify the user of an incoming message when the current driving conditions are safe.

18. The computer program product of claim 16, wherein the computer-executable instructions comprise instructions to:
   present a graphical user interface on a touch screen.

19. The computer program product of claim 18, the graphical user interface comprising one or more radio buttons, each radio button associated with one or more of the contextual awareness metrics.

20. The computer program product of claim 16, wherein the computer-executable instructions comprise instructions to:
   prioritize incoming messages by source.

* * * * *